US011321514B1

(12) United States Patent
Meyer et al.

(10) Patent No.: US 11,321,514 B1
(45) Date of Patent: May 3, 2022

(54) MACRO CLOCK LATENCY COMPUTATION IN MULTIPLE ITERATION CLOCK TREE SYNTHESIS

(71) Applicant: Cadence Design Systems, Inc., San José, CA (US)

(72) Inventors: Dirk Meyer, Elsworth (GB); Ben Thomas Beaumont, Oakington (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/139,612

(22) Filed: Dec. 31, 2020

(51) Int. Cl.
*G06F 30/396* (2020.01)
*G06F 30/392* (2020.01)
*G06F 111/04* (2020.01)

(52) U.S. Cl.
CPC .......... *G06F 30/396* (2020.01); *G06F 30/392* (2020.01); *G06F 2111/04* (2020.01)

(58) Field of Classification Search
USPC ........................................................ 716/113
See application file for complete search history.

(56) References Cited

U.S. PATENT DOCUMENTS

| | | | | |
|---|---|---|---|---|
| 2004/0225984 A1* | 11/2004 | Tsao | ......................... | G06F 1/10 716/114 |
| 2005/0102643 A1* | 5/2005 | Hou | ......................... | G06F 1/10 716/104 |
| 2006/0248486 A1* | 11/2006 | Barnes | ..................... | G06F 30/39 716/113 |
| 2012/0139590 A1* | 6/2012 | Myers | ................... | G06F 1/3237 327/113 |
| 2015/0213186 A1* | 7/2015 | Le Bars | .............. | G06F 30/3312 716/114 |

* cited by examiner

*Primary Examiner* — Mohammed Alam
(74) *Attorney, Agent, or Firm* — Schwegman Lundberg & Woessner, P.A.

(57) ABSTRACT

Aspects of the present disclosure address systems and methods for clock tree synthesis (CTS). A first iteration of CTS is performed to generate an intermediate clock tree for an integrated circuit (IC) design that includes one or more macros. Target pin insertion delays (PIDs) for the one or more macros are computed based on the intermediate clock tree using a linear program. A second iteration of CTS is performed using the target PIDs for the one or more macros to generate an optimized clock tree for the IC design.

20 Claims, 6 Drawing Sheets

MACRO CLOCK LATENCY COMPUTATION IN MULTIPLE ITERATION CLOCK TREE SYNTHESIS

TECHNICAL FIELD

The present disclosure generally relates to the technical field of integrated circuit design. In particular, the present disclosure addresses a multiple iteration clock tree synthesis process that includes a target macro clock latency computation.

BACKGROUND

An integrated circuit (IC) layout specifies portions of various components of an IC device. When the IC is to include cells, macros, and/or other types of clocked devices ("sinks") that are to be clocked, the IC includes one or more clock networks for delivering a clock signal from a clock source to all of the components to be clocked by it. A clock network distributes a clock signal from its root (e.g., a clock source) to sinks (e.g., macros or flip flops) within an IC through a branching network of drivers (e.g., buffers or inverters).

Electronic design automation (EDA) software systems commonly perform clock-tree synthesis (CTS). Conventional approaches to CTS include building a clock tree by placing drivers at various regions of the clock network based on satisfaction of a set of clock tree design constraints that include timing constraints such as clock skew among others (e.g., clock slew and clock latency). Clock skew refers to a difference in clock arrival time between two clock sinks.

In some instances, clock skew may be intentionally added into a clock tree. For example, during CTS, a clock path delay for each clock sink is tuned in accordance with design constraints. Prior to tuning clock path delays, a pin insertion delay (PID) can be assigned to a clock path and provided as a constraint to CTS. PID is a virtual delay added to a clock path of the IC design that causes CTS to intentionally introduce skew when tuning clock path delays.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Many IC designs include macros. A macro is a sub-block in an IC design that has its own internal clock network that often cause the macro to have a large internal clock latency. In physical IC design flows, macros can present significant challenges in stages that are performed after CTS to close timing (e.g., satisfying clock tree and other timing constraints). For example, in conventional CTS, a uniform PID for macros is often selected typically through a manual tuning process. The selected PID for macros is often a sub-optimal value that result in a large hold total negative slack (TNS) in the resulting clock tree. A large hold TNS can be difficult and expensive to correct in subsequent stages of the design flow and can lead to significant area degradations given the large number of pins that macros often have. In the context of IC design, "slack" refers to a difference between a required time and an arrival time of a signal. A negative setup slack refers to a signal in which the arrival time is after the required time (e.g. at the endpoint of a path where a data signal is captured). A negative hold slack refers to a signal of the next cycle arriving before the signal of the current cycle has been captured. TNS corresponds to a sum of negative slacks (e.g. the sum of the slacks at all endpoints of the datapath).

In traditional design flows, CTS is performed only once. As a result, the full timing of macros is not considered in CTS when implementing clock latencies because the timing of macros can only be accurately determined when the timing of the clock trees and datapath are analyzed after CTS is performed. What's more, conventional concurrent datapath and clock tree optimization techniques do not consider hold timing to skew macros.

Aspects of the present disclosure address the above referenced issues with traditional approaches to CTS, among others, by computing target pin insertion delays (PIDs) for each macro in the clock network after performing a first iteration of CTS and considering the target macro PIDs in a second iteration of CTS. For example, consistent with certain embodiments, a method includes performing a first iteration of CTS on an IC design to generate an intermediate clock tree solution. Target PIDs for macros in the design are computed using linear programming based on the intermediate clock tree solution. The target PIDs computed through linear programming improve the setup and hold timing of the resulting clock tree. The method further includes performing a second iteration of CTS using the target macro PIDs to generate an optimized clock tree for the IC design with improved timing (e.g., WNS, TNS) relative to the intermediate clock tree. The second iteration of CTS can include a complete re-run of CTS or simply an incremental adjustment of the clock network (incremental CTS) based on the macro PIDs, which can reduce run-time and the variation in results of the second iteration.

The automatic skewing of macro clock latencies, as described herein, results in a higher degree of design automation and faster design closure. In addition, the automatic skewing of macro latencies also improves power, performance, and area by reducing total negative slack, design area, and density. What's more, by automatically skewing macro clock latencies, the runtime of post CTS stages that attempt to fix hold timing is reduced.

Figure 1:
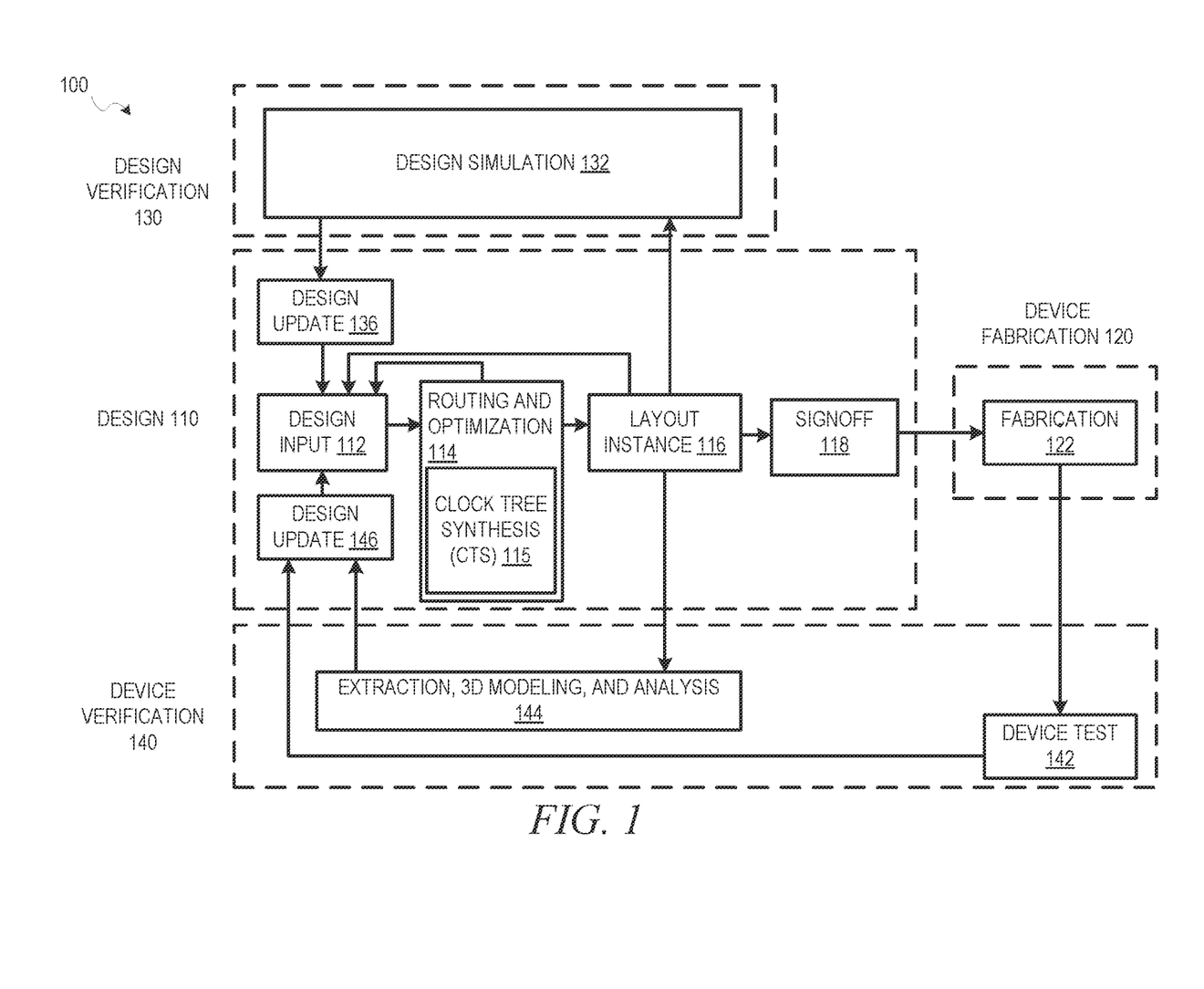
FIG. 1 is a diagram illustrating an example design process flow that includes a multi-iteration clock tree synthesis (CTS) method in which target pin insertion delays for macros are computed and used in creating an optimized clock tree, according to some embodiments.

FIG. 1 is a diagram illustrating an example design process flow 100 that includes a multi-iteration clock tree synthesis (CTS) method in which target pin insertion delays for macros are computed and used in creating an optimized clock tree. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows the routing and optimization 114 operation occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a clock tree synthesis (CTS) 115 process, which may be performed in accordance with various embodiments described herein. The CTS 115 process generates a clock tree that delivers a clock signal from a clock tree root, which comprises a clock source of a circuit design, to clock tree leaf nodes, which comprise clock tree sinks within the circuit design. In generating the clock tree, The CTS 115 process instantiates clock circuitry or builds one or more clock buffer trees according to a clock tree specification file, generates a clock tree topology, and balances clock delay in the clock tree. Each buffer tree comprises a clock buffer, a set of clock sinks, and paths connecting the clock buffer to each clock sink in the set of clock sinks.

According to various embodiments, the balancing of the clock delay of the clock tree performed as part of the CTS 115 process may include placing clock buffers on paths of a buffer tree (also referred to as "clock buffering" or simply as "buffering") based on satisfaction of a set of clock tree design constraints, which can include timing constraints such as a clock slew and latency. In addition to clock buffering, the balancing of the clock delay of the clock tree may include any one or more of: resizing a clock tree instance (e.g., a buffer, inverter, clock gate, or clock logic), moving a clock tree instance to a different location, cloning a clock tree instance and partitioning the fanout between the clone, merging two clock tree instances together, and modifying clock net routing to change the delay to the fanout of the net.

Multiple iterations of the CTS 115 process are performed. For example, a first iteration of CTS is performed in accordance with the process described above to generate an intermediate clock tree solution. Target PIDs for macros in the clock network are computed using linear programming based on the intermediate clock tree solution. A second iteration of the CTS 115 process is performed using the target PID computed for each macros to generate an optimized clock tree for the IC design with optimized timing (e.g., minimized WNS and/or TNS) relative to the intermediate clock tree. During the second iteration of the CTS 115 process, which may also be an incremental change to the clock network to reduce runtime or the unintended variation of results, one or more clock buffers can be added in a clock path of a given macro to introduce skew in accordance with the target PID computed for that macro.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
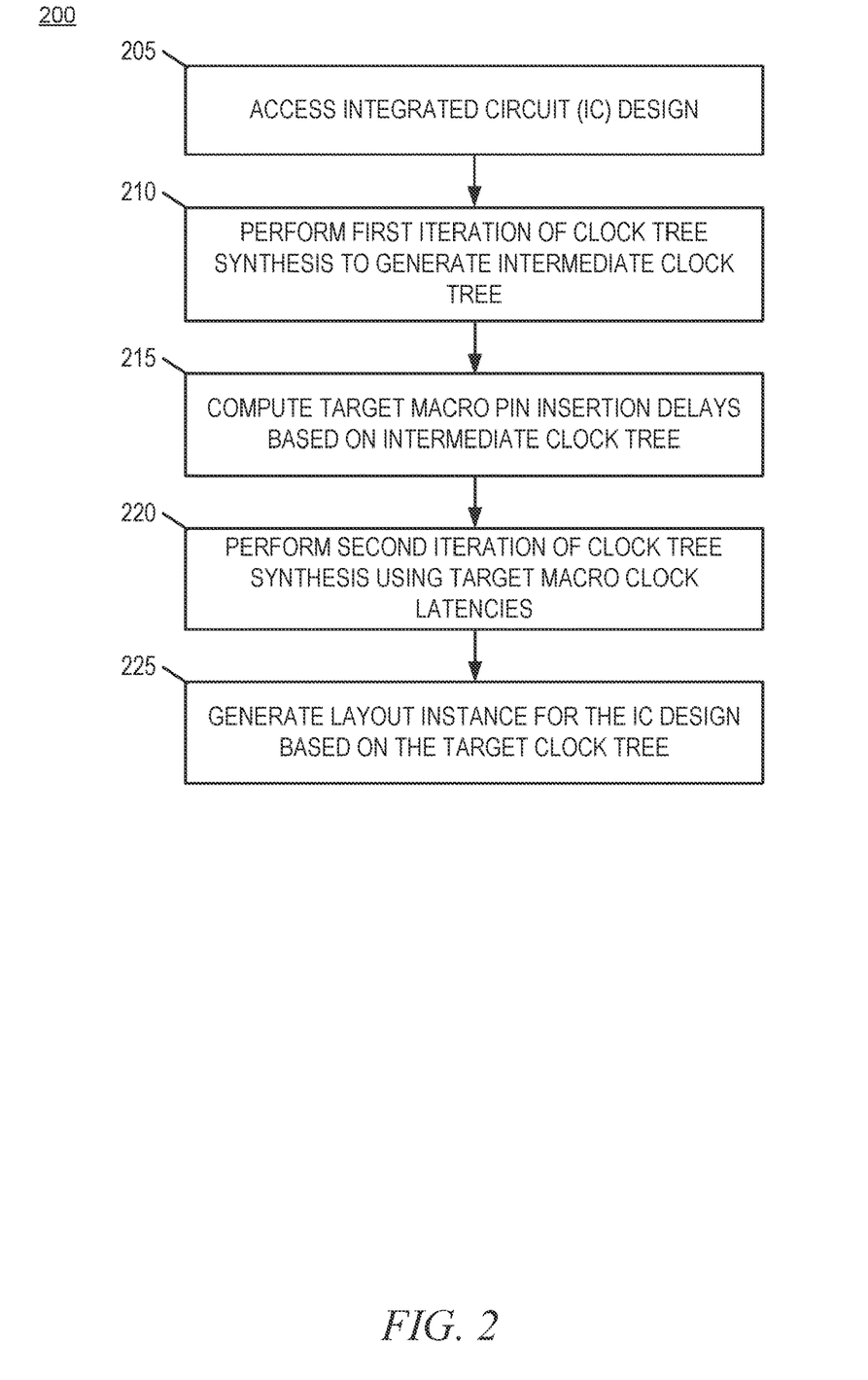
FIG. 2-5 are flow diagrams illustrating operations performed by a computing device executing an EDA software system in performing the multi-iteration CTS method, according to some embodiments.

FIG. 2 is a flowchart illustrating operations of a method 200 . . . , according to some example embodiments. It will be understood that the method 200 may be performed by a device, such as a computing device executing instructions of an EDA software system. For instance, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below with reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200, as illustrated, begins at operation 205 where the computing device accesses an IC design stored in memory. The IC design comprises a clock network that includes one or more macros. The clock network can include one or more buffer trees. Each buffer tree comprises a buffer and a set of clock sinks connected to the buffer.

At operation 210, the computing device performs a first iteration of CTS to build an intermediate clock tree. The first iteration of CTS is performed without any pre-existing pin insertion delays (PIDs) for the macros in the design or with the user defined PIDs. That is, the computing device performs the first iteration of CTS without making any positive or negative adjustments to clock latencies of macro clock latencies relative to the latency of other clock sinks, or in a way guided by the user. The computing device builds the intermediate clock tree based on the clock network in the IC design. For example, in building the clock tree, the computing device places clock drivers at various regions of the IC design. The computing device may place one or more clock drivers in any one of the clock paths that connect clock sinks to a buffer in accordance with clock tree design constraints.

At operation 215, the computing device computes target pin insertion delays (PIDs) for each macro in the IC design using linear programming. That is, the computing device can determine a first PID for a first macro, a second PID for a second macro, a third PID for a third macro, and so forth. As an example, the computing device can utilize a linear program in which target PIDs are the decision variables, which may be bound by maximum deviations from current values. PIDs are also bound by the minimum achievable delay for a clock signal to propagate from the clock source to a given clock sink through the clock network.

The linear programming used to determine target macro PIDs relies upon predefined linear slack relationship models. As an example, for a path that begins a flop and ends at a macro, the slack relationship in the path can be defined as $slack_{setup} - pid \geq 0$ and $slack_{hold} + pid \geq 0$. As another example, for a path that begins at a macro and ends at a flop, the slack relationship for the path can be defined as $slack_{setup} + pid \geq 0$ and $slack_{hold} - pid \geq 0$. As yet another example, for a path that begins at a first macro and ends at second macro, the slack relationship for the path can be defined as $slack_{setup} + pid_{launch} - pid_{capture} \geq 0$ and $slack_{hold} - pid_{launch} + pid_{capture} \geq 0$.

The linear programming utilized by the computing device uses multiple objective functions. For example, the computing device can utilize total negative slack (TNS) or worst negative slack (WNS) as an object function for linear programming. That is, the computing device may utilize a first linear program with an objective of minimizing TNS to determine a global optimum solution for target PIDs for macros in the clock network. For example, for clock paths that end at a macro, the computing device can utilize the following objective function for TNS:

$$TNS: \Sigma \min(slack_{macro_i/D[j]}, 0) \rightarrow \max$$

Following this example, for clock paths that begin with a macro, the computing device can utilize the following objective function for TNS:

$$TNS: \Sigma \min(slack_{ff_i/D}, 0) \rightarrow \max$$

The computing device can further utilize a second linear program with an objective to minimize WNS to determine a global optimum solution for target PIDs for macros in the clock network. For example, for clock paths that end at a macro, the computing device can utilize the following objective function for WNS:

$$WNS: L \leq \min(slack_{macro_i/D[j]}, 0), L \rightarrow \max$$

Following this example, for clock paths that begin with a macro, the computing device can utilize the following objective function for TNS:

$$WNS: L \leq \min(slack_{macro_i/Q[j]}, 0)), L \rightarrow \max$$

In computing the target PIDs for each macro in the clock network, the computing device may also rely on various combinations of both linear programs. Further details regarding the target PID computation are described below in reference to FIGS. 3-5.

At operation 220, the computing device performs a second iteration of CTS using the target PIDs computed for the macros in the IC design. In performing the second iteration of CTS, the computing device generates an enhanced clock tree with improved timing relative to the intermediate clock tree. The performing of the second iteration of CTS can include adding one or more clock buffers in a clock path of a macro to introduce skew in accordance with a target PID computed for the macro. As noted above, consistent with some embodiments, the second iteration of CTS includes performing an incremental CTS that includes an incremental adjustment to the clock network based on the target PIDs. The increment CTS can be performed in the second iteration to reduce run-time and the variation in results of the second iteration.

At operation 225, the computing device generates a layout instance 116 for the IC design based on the target clock tree. The layout instance 116 for the IC design describes physical layout dimensions of the IC device design.

Figure 3:
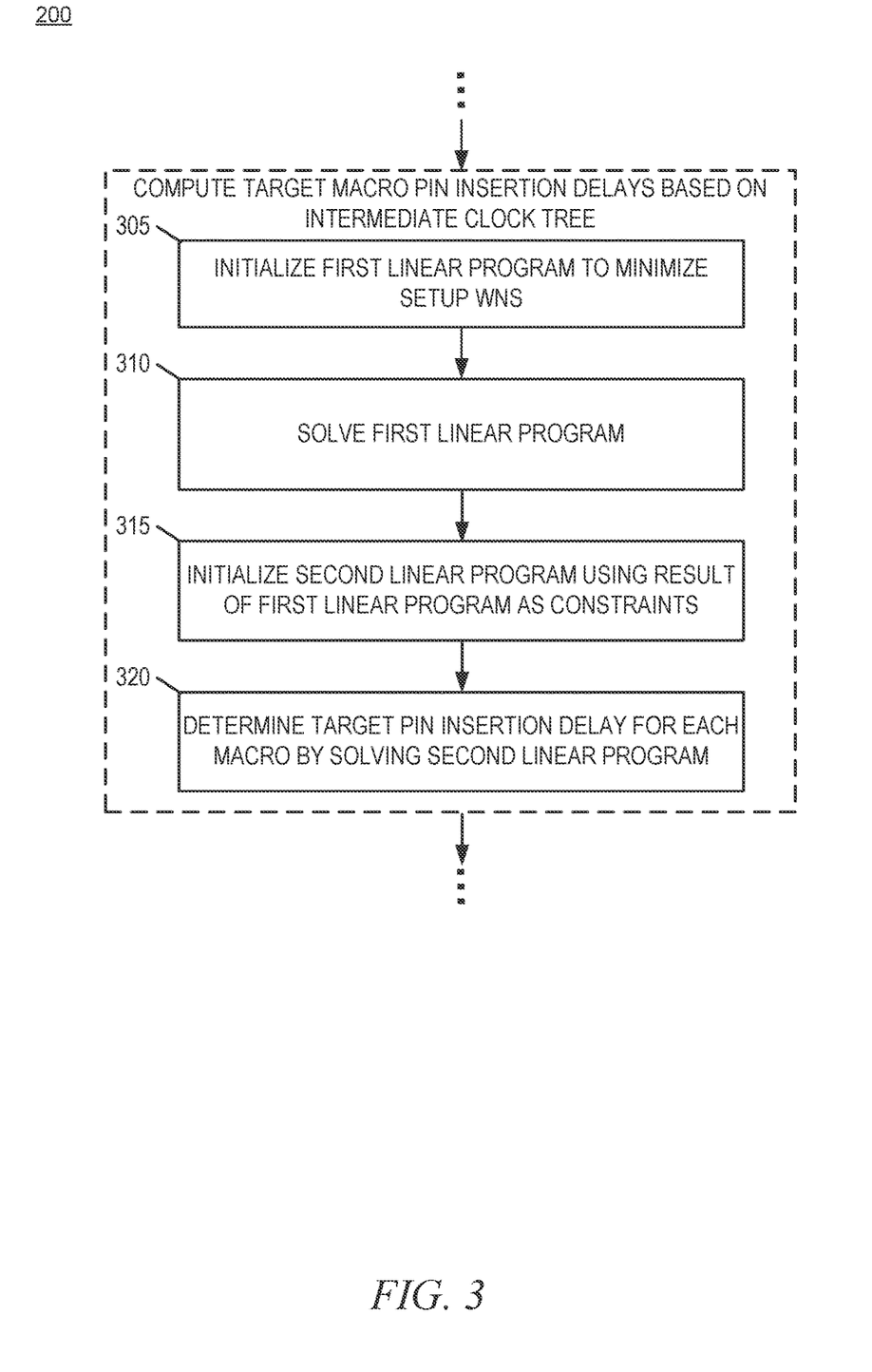

As shown in FIG. 3, the method 200 can include operations 305, 310, 315, and 320, according to some embodiments. Consistent with these embodiments, the operations 305, 310, 315, and 320 can be performed as part of operation 215, where the computing device computes target PIDs for macros in the IC design.

At operation 305, the computing device initializes a first linear program to determine a global optimum for macro PIDs that minimize setup WNS in the clock network. That is, the computing device establishes setup WNS as the objective function for the linear program and macro PIDs as the decision variables. The computing device solves the first linear program, at operation 310. In doing so, the computing device determines a PIDs for each macro that collectively minimize setup WNS.

At operation 315, the computing device initializes a second linear program for program for a global optimum for macro PIDs that minimize hold TNS in the clock network. That is, the computing device establishes hold TNS as the objective function for the second linear program and macro PIDs as the decision variables. In initializing the second linear program, the computing device uses the result of the first linear program as a constraint. That is, within the second linear program, the computing device establishes a constraint on setup WNS within the second linear program based on a result of the first linear program. At operation 320, the computing device determines a target PID for each macro in the design by solving the second linear program.

Figure 4:
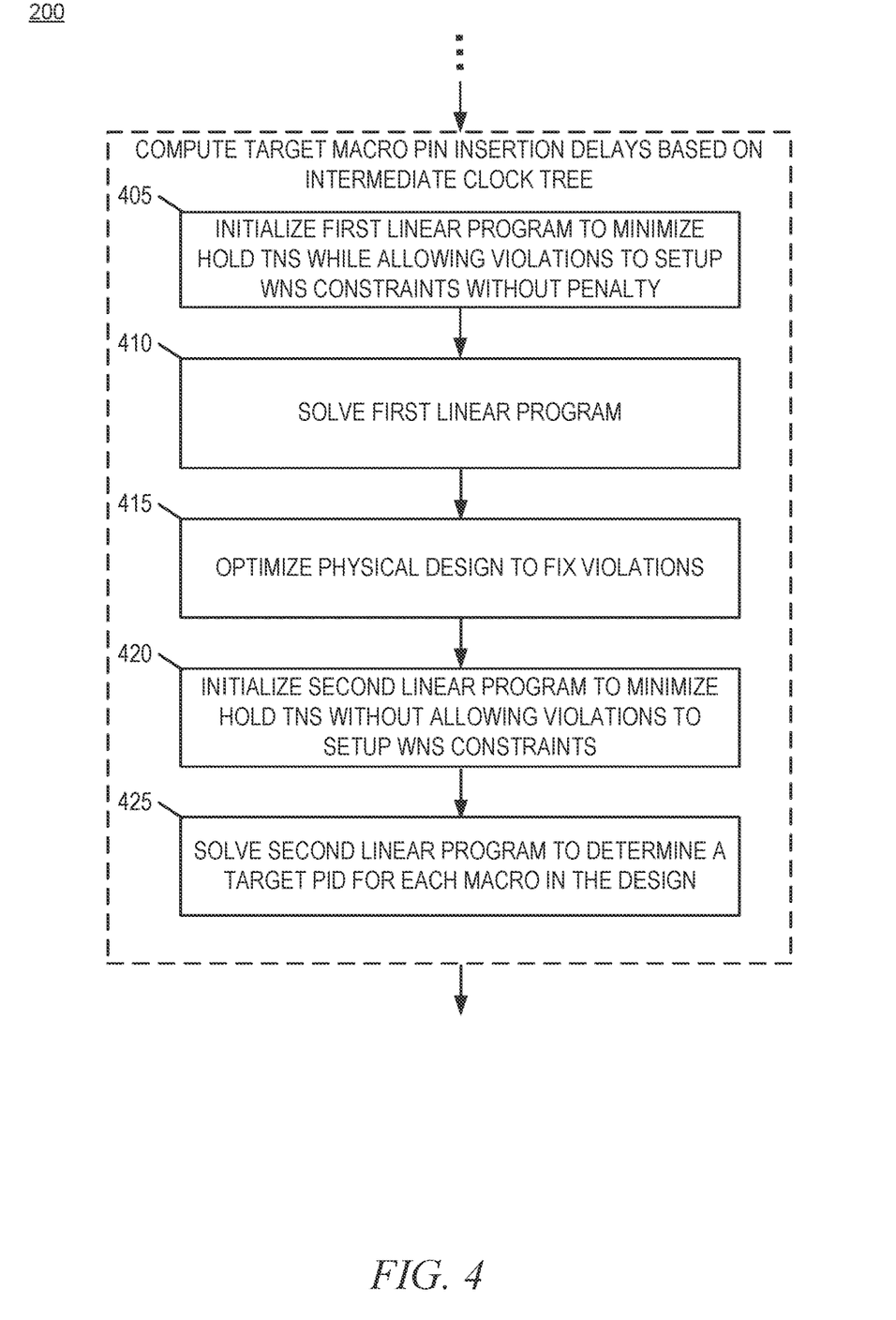

As shown in FIG. 4, the method 200 can include operations 405, 410, 415, 420, and 425 according to some embodiments. Consistent with these embodiments, the operations 405, 410, 415, 420, and 425 can be performed as part of operation 215, where the computing device computes target PIDs for macros in the IC design.

At operation 405, the computing device initializes a first linear program to determine a global optimum for macro PIDs that minimize hold TNS in the clock network. That is, the computing device establishes hold TNS as the objective function for the linear program and macro PIDs as the decision variables. The computing device further establishes constraints for setup WNS while allowing violations with a penalty. At operation 410, the computing device solves the first linear program to determine PIDs for each macro in the IC design that collectively minimize hold TNS.

At operation 415, the computing device optimizes the physical IC design to correct the violations to the WNS constraints in the results of solving the first linear program. The computing device optimizes the physical IC design by augmenting the clock paths in the design based on the PIDs computed in the previous step and optimizing the datapath. In doing so, the computing device can use one or more known optimization techniques such resizing or rebuffering the datapath or portions of the datapath.

At operation 420, the computing device initializes a second linear program to determine a global optimum for macro PIDs that minimize hold TNS in the augmented design. In initializing the second linear program, the computing device establishes constraints for setup WNS without allowing violations. At operation 425, the computing device determines the target PID for each macro by solving the second linear program.

Figure 5:
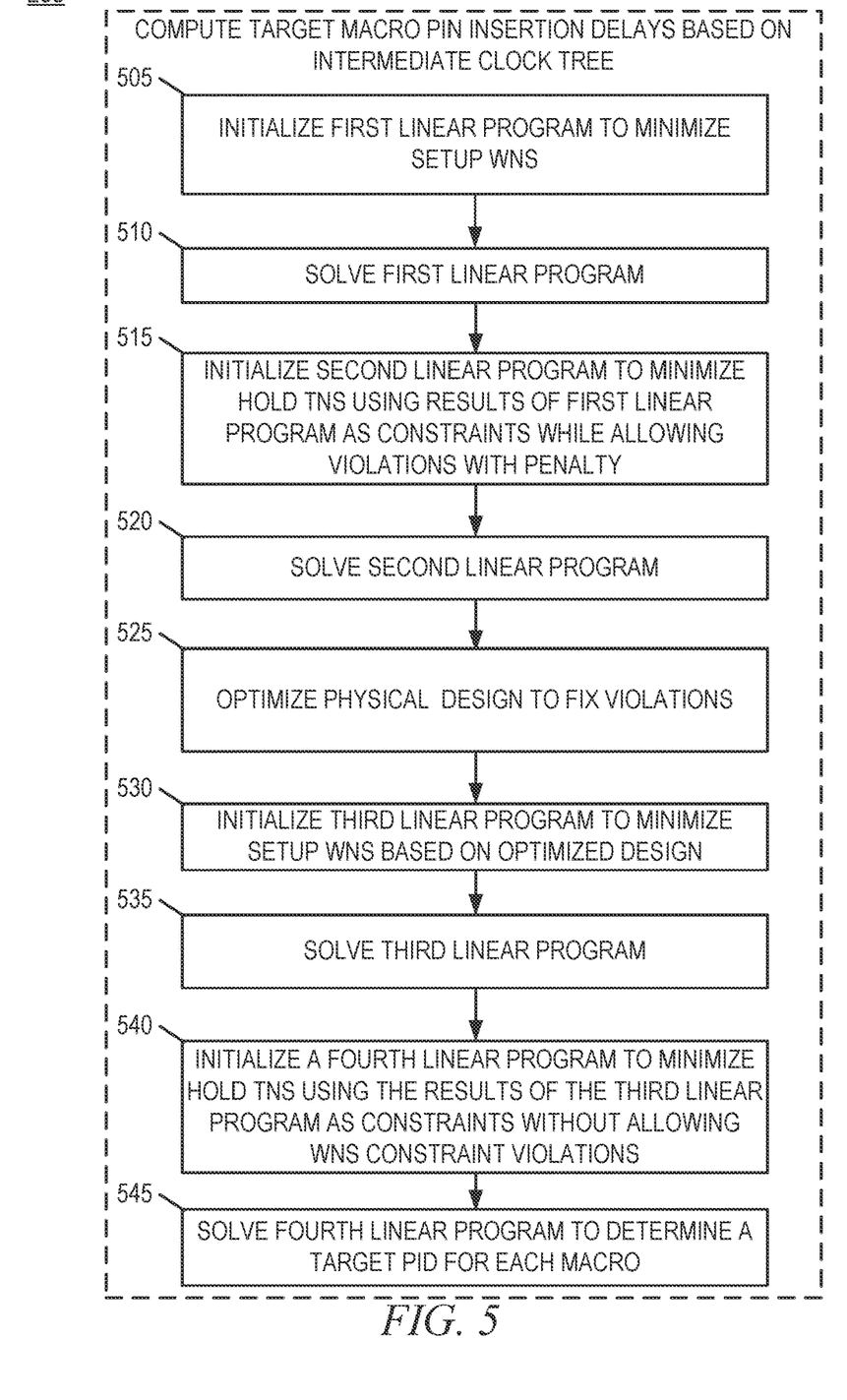

As shown in FIG. 5, the method 200 can include operations 505, 510, 515, 520, 525, 540, and 545, according to some embodiments. Consistent with these embodiments, the operations 505, 510, 515, 520, 525, 540, and 545 can be performed as part of operation 215, where the computing device computes target PIDs for macros in the IC design.

At operation 505, the computing device initializes a first linear program to determine a global optimum for macro PIDs that minimize setup WNS. That is, the computing device establishes setup WNS as the objective function for the linear program and macro PIDs as the decision variables. The computing device solves the first linear program, at operation 510. In doing so, the computing device determines PID values for macros that minimize setup WNS.

At operation 515, the computing device initializes a second linear program to determine a global optimum for macro PIDs that minimize hold TNS. That is, the computing device establishes hold TNS as the objective function for the second linear program and macro PIDs as the decision variables. In initializing the second linear program, the computing device uses the result of the first linear program as a constraint while allowing setup WNS degradation. That is, within the second linear program, the computing device constrains the decision variables using the values determined from solving the first linear program while allowing degradations to setup WNS. At operation 520, the computing device solves the second linear program to determine PIDs for each macro that collectively minimize hold TNS.

At operation 525, the computing device optimizes the physical IC design to correct degradations to setup WNS which may be caused by augmenting clock paths based on the pin insertion delays computed in 520. The datapath is optimized to reduce or remove degradations to setup WNS. In doing so, the computing device can use one or more known optimization techniques such resizing or rebuffering the datapath or portions thereof.

At operation 530, the computing device initializes a third linear program to a global optimum for macro PIDs that minimize setup WNS based on the augmented IC design. The computing device determines PID values for macros that minimize setup WNS by solving the first linear program, at operation 535.

At operation 540, the computing device initializes a fourth linear program to a global optimum for macro PIDs that minimize hold TNS. In initializing the fourth linear program, the computing device uses the result of the third linear program as a constraint without allowing setup WNS degradation. At operation 545, the computing device determines target macro PIDs by solving the fourth linear program.

Figure 6:
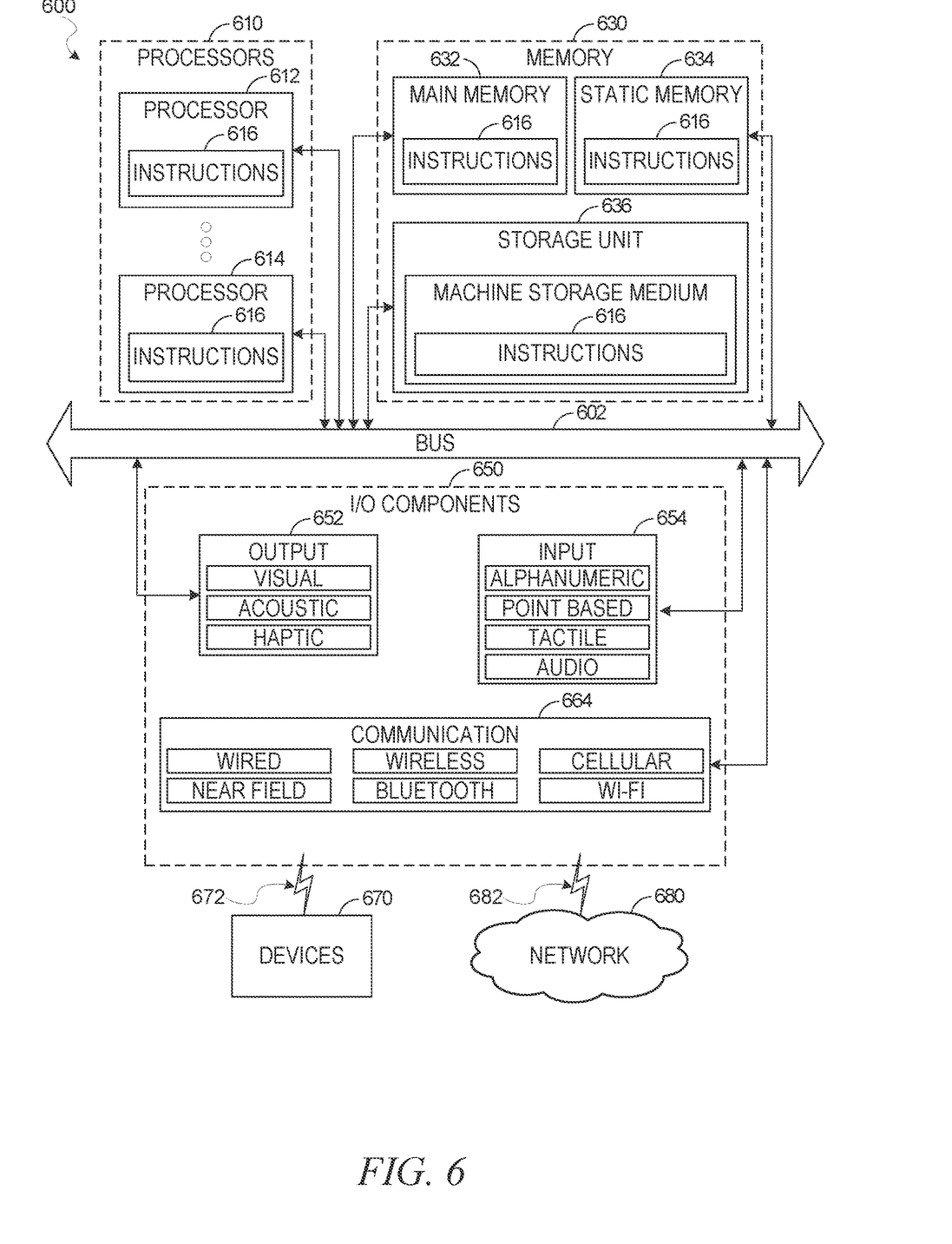
FIG. 6 is a diagrammatic representation of a machine in the example form of a computer system within which a set of instructions for causing the machine to perform any one or more of the methodologies discussed herein may be stored and executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute an EDA software system that executes the method 200. The instructions 616 transform the general, non-programmed machine 600 into a particular machine 600 programmed to carry out the described and illustrated functions in the manner described here. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 610 with a single core, multiple processors 610 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components (NFC, Bluetooth, and Wifi) to provide communication via other modalities. The devices 670 may be another machine or any of a wide variety of peripheral devices (e.g., a peripheral device coupled via a universal serial bus (USB)).

Executable Instructions and Machine-Storage Medium

The various memories (e.g., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions 616, when executed by the processor(s) 610, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the machine, cause the machine to perform operations comprising:
      accessing an integrated circuit (IC) design comprising a clock network including one or more macros;
      performing a first iteration of clock tree synthesis to generate an intermediate clock tree based on the clock network;
      computing, using linear programming, a target pin insertion delay for each of the one or more macros based on the intermediate clock tree;
      performing a second iteration of clock tree synthesis using the target pin insertion delay computed for each of the one or more macros, the performing of the second iteration of clock tree synthesis including making an incremental adjustment to the clock network based on the target pin insertion delay computed for each of the one or more macros, the performing of the second iteration of clock tree synthesis resulting in an enhanced clock tree with improved timing relative to the intermediate clock tree; and
      generating a layout instance for the IC design based on the enhanced clock tree.

2. The system of claim 1, wherein performing the second iteration of clock tree synthesis includes adding one or more clock buffers in a clock path of a macro in the clock network to introduce skew corresponding to a target pin insertion delay computed for the macro.

3. The system of claim 1, wherein an objective function used in the linear programming is based on minimizing one or more of setup or hold total negative slack (TNS) or setup or hold worst negative slack (WNS) in the clock network.

4. The system of claim 1, wherein the computing of the target pin insertion delay for each of the one or more macros comprises:
   initializing a first linear program for determining macro pin insertion delays that minimize setup WNS in the clock network;
   solving the first linear program;
   initializing a second linear program based on a result of solving the first linear program, the second linear program for determining macro pin insertion delays that minimizes hold TNS in the clock network; and
   determining the target pin insertion delay for each of the one or more macros by solving the second linear program.

5. The system of claim 4, wherein initializing of the second linear programing includes:
   establishing the result of the first linear program as a constraint on setup WNS in the second linear program.

6. The system of claim 1, wherein the computing of the target pin insertion delay for each of the one or more macros comprises:
   initializing a first linear program for determining macro pin insertion delays that minimize setup hold TNS in the clock network, the initializing of the first linear program including establishing a first constraint on setup WNS while allowing violations with penalty;

solving the first linear program;

augmenting the IC design to fix one or more violations to the constraint on setup WNS based on a result of solving the first linear program, the augmenting of the IC design resulting in an augmented IC design;

initializing a second linear program based on an augmented IC design; and determining the target pin insertion delay for each of the one or more macros by solving the second linear program.

7. The system of claim 6, wherein:

initializing the second linear program comprises establishing a second constraint on setup WNS without allowing violations to the second constraint on setup WNS; and the second linear program determines macro pin insertion delays that minimize hold TNS in the augmented IC design.

8. The system of claim 1, wherein the computing of the target pin insertion delay for each of the one or more macros comprises:

initializing a first linear program for determining macro pin insertion delays that minimize setup WNS in the clock network;

solving the first linear program;

initializing a second linear program based on a result of solving the first linear program, wherein the second linear program determines macro pin insertion delays that minimize hold TNS in the clock network;

solving the second linear program;

augmenting the IC design to fix one or more violations to a constraint on setup WNS based on a result of solving the second linear program;

initializing a third linear program based on an augmented IC design, the wherein the third linear program determines macro pin insertion delays that minimizes hold setup WNS;

solving the third linear program;

initializing a fourth linear program based on a result of solving the third linear program, the fourth linear program determines macro pin insertion delays that minimize hold TNS in the augmented IC design; and determining the target pin insertion delay for each of the one or more macros by solving the fourth linear program.

9. The system of claim 8, wherein:

the constraint on setup WNS is a first constraint;

initializing the second linear program includes establishing the first constraint on setup WNS based on a result of solving the first linear program while allowing violations to the constraint with penalty; and initializing the fourth linear program includes establishing a second constraint on setup WNS based on a result of solving the fourth linear program without allowing violations to the second constraint.

10. A method comprising:

performing, by a hardware processor of a machine, a first iteration of clock tree synthesis to generate an intermediate clock tree based on a clock network that includes one or more macros;

computing, using linear programming, a target pin insertion delay for each of the one or more macros based on the intermediate clock tree;

performing, by a hardware processor of the machine, a second iteration of clock tree synthesis using the target pin insertion delay computed for each of the one or more macros, the performing of the second iteration of clock tree synthesis including making an incremental adjustment to the clock network based on the target pin insertion delay computed for each of the one or more macros, the performing of the second iteration of clock tree synthesis resulting in an optimized clock tree; and generating, by a hardware processor of the machine, a layout instance for an IC design based on the optimized clock tree.

11. The method of claim 10, wherein performing the second iteration of clock tree synthesis includes adding one or more clock buffers in a clock path of a macro in the clock network to introduce skew corresponding to a target pin insertion delay computed for the macro.

12. The method of claim 10, wherein an objective function used in the linear programming is based on minimizing one or more of hold total negative slack (TNS) or setup worst negative slack (WNS) in the clock network.

13. The method of claim 10, wherein the computing of the target pin insertion delay for each of the one or more macros comprises:

initializing a first linear program for determining macro pin insertion delays that minimize setup WNS in the clock network;

solving the first linear program;

initializing a second linear program based on a result of solving the first linear program, the second linear program for determining macro pin insertion delays that minimizes hold TNS in the clock network; and determining the target pin insertion delay for each of the one or more macros by solving the second linear program.

14. The method of claim 13, wherein initializing of the second linear programing includes:

establishing the result of the first linear program as a constraint on setup WNS in the second linear program.

15. The method of claim 10, wherein the computing of the target pin insertion delay for each of the one or more macros comprises:

initializing a first linear program for determining macro pin insertion delays that minimize setup hold TNS in the clock network, the initializing of the first linear program including establishing a first constraint on setup WNS while allowing violations with penalty;

solving the first linear program;

augmenting the IC design to fix one or more violations to the constraint on setup WNS based on a result of solving the first linear program;

initializing a second linear program based on an augmented IC design; and determining the target pin insertion delay for each of the one or more macros by solving the second linear program.

16. The method of claim 15, wherein:

initializing the second linear program comprises establishing a second constraint on setup WNS without allowing violations to the second constraint on setup WNS; and the second linear program determines macro pin insertion delays that minimize hold TNS in the augmented IC design.

17. The method of claim 10, wherein the computing of the target pin insertion delay for each of the one or more macros comprises:

initializing a first linear program for determining macro pin insertion delays that minimize setup WNS in the clock network;

solving the first linear program;

initializing a second linear program based on a result of solving the first linear program, wherein the second linear program determines macro pin insertion delays that minimize hold TNS in the clock network;

solving the second linear program;

augmenting the IC design to fix one or more violations to a constraint on setup WNS based on a result of solving the second linear program;

initializing a third linear program based on an augmented IC design, the wherein the third linear program determines macro pin insertion delays that minimizes hold setup WNS;

solving the third linear program;

initializing a fourth linear program based on a result of solving the third linear program, the fourth linear program determines macro pin insertion delays that minimize hold TNS in the augmented IC design; and determining the target pin insertion delay for each of the one or more macros by solving the fourth linear program.

18. A computer storage medium storing instructions which, when executed by a machine, cause the machine to perform operations comprising:

accessing, from memory, an integrated circuit (IC) design comprising a clock network including one or more macros;

performing a first iteration of clock tree synthesis to generate an intermediate clock tree based on the clock network;

computing, using linear programming, a target pin insertion delay for each of the one or more macros based on the intermediate clock tree;

performing a second iteration of clock tree synthesis using the target pin insertion delay computed for each of the one or more macros, the performing of the second iteration of clock tree synthesis including making an incremental adjustment to the clock network based on the target pin insertion delay computed for each of the one or more macros, the performing of the second iteration of clock tree synthesis resulting in an enhanced clock tree with improved timing relative to the intermediate clock tree; and generating a layout instance for the IC design based on the enhanced clock tree.

19. The computer storage medium of claim 18, wherein performing the second iteration of clock tree synthesis includes adding one or more clock buffers in a clock path of a macro in the clock network to introduce skew corresponding to a target pin insertion delay computed for the macro.

20. The computer storage medium of claim 18, wherein an objective function used in the linear programming is based on minimizing one or more of hold total negative slack (TNS) or setup worst negative slack (WNS) in the clock network.

* * * * *